United States Patent
Garotte

(10) Patent No.: US 8,763,975 B2
(45) Date of Patent: Jul. 1, 2014

(54) SET OF SLIDES FOR VEHICLE SEATS AND VEHICLE SEAT INCLUDING SUCH A SET OF SLIDES

(75) Inventor: Gérald Garotte, Bellou en Houlme (FR)

(73) Assignee: Faurecia Sièges d'Automobile, Paris (FR)

( * ) Notice: Subject to any disclaimer, the term of this patent is extended or adjusted under 35 U.S.C. 154(b) by 402 days.

(21) Appl. No.: 13/302,004

(22) Filed: Nov. 22, 2011

(65) Prior Publication Data

US 2012/0153696 A1    Jun. 21, 2012

(30) Foreign Application Priority Data

Dec. 21, 2010 (FR) .................................... 10 60951

(51) Int. Cl.
*F16M 13/00* (2006.01)

(52) U.S. Cl.
USPC .......................................... 248/424; 248/429

(58) Field of Classification Search
USPC ............ 248/298.1, 424, 429, 430; 296/65.11, 296/65.13, 65.14; 297/344.1, 344.11
See application file for complete search history.

(56) References Cited

U.S. PATENT DOCUMENTS

| | | | | |
|---|---|---|---|---|
| 5,167,393 A | * | 12/1992 | Hayakawa et al. | 248/430 |
| 5,342,013 A | * | 8/1994 | Ito et al. | 248/429 |
| 6,378,928 B1 | * | 4/2002 | Downey | 296/65.13 |
| 2008/0251679 A1 | | 10/2008 | Stoia et al. | |
| 2009/0314916 A1 | | 12/2009 | Kojima et al. | |

FOREIGN PATENT DOCUMENTS

| | | |
|---|---|---|
| DE | 3346754 A1 | 7/1985 |
| DE | 19911281 A1 | 9/2000 |
| DE | 102006000951 B2 | 8/2007 |
| DE | 102007018101 A1 | 10/2008 |
| FR | 2831228 A1 | 4/2003 |
| FR | 2919234 A1 | 3/2009 |

OTHER PUBLICATIONS

French Search Report and Written Opinion for related French Application No. FR 10 60951; report dated May 18, 2011.

* cited by examiner

*Primary Examiner* — Gwendolyn W Baxter
(74) *Attorney, Agent, or Firm* — Miller, Matthias & Hull LLP

(57) ABSTRACT

A set of slides for vehicle seats including two slide locks actuated by a cross-bar assembly pivotally mounted on the two slides by means of bearings. The bearings each include an indentation and the ends of the cross-bar assembly each include a tooth enabling nesting of the cross-bar assembly in the bearing parallel to the pivot axis. The tooth retains the end of the cross-bar assembly in the bearing.

7 Claims, 7 Drawing Sheets

SET OF SLIDES FOR VEHICLE SEATS AND VEHICLE SEAT INCLUDING SUCH A SET OF SLIDES

CROSS-REFERENCE TO RELATED APPLICATIONS

This application claims priority under the Paris Convention to the French Patent Application No. 10 60951, filed on Dec. 21, 2010.

FIELD OF THE DISCLOSURE

The present invention relates to sets of slides for vehicle seats and to vehicle seats including such sets of slides.

The invention concerns more particularly a set of slides for vehicle seats including two parallel slides, each slide including:

first and second structural sections mounted to slide relative to each other in a longitudinal direction, the second structural section of each slide including a bearing of circular general shape, a lock adapted selectively to prevent or allow relative sliding between the first and second structural sections, the set of slides further including a cross-bar assembly having two circular-section bearing surfaces that is pivotally mounted in the respective bearings to pivot about a transverse pivot axis perpendicular to the longitudinal direction, said cross-bar assembly extending beyond said bearings as far as two ends, the cross-bar assembly being urged toward a rest position in which it does not interfere with the locks of the slides and said cross-bar assembly being adapted to be moved manually to an actuating position to unlock the locks of the slides.

BACKGROUND OF THE DISCLOSURE

The document US2009/0314916 describes one example of such a slide.

Slides of this type have the drawback that if the vehicle in which the seat is installed suffers a violet impact the two slides may in some cases tend to separate from each other, in which event the cross-bar assembly may be demounted from the slides and thrown off, with the risk of injuring an occupant of the vehicle.

SUMMARY OF THE DISCLOSURE

A notable object of the present invention is to alleviate this disadvantage.

To this end, according to the invention, a set of slides of the kind in question is characterized in that each end of the cross-bar assembly includes at least one tooth projecting radially outward and the corresponding bearing includes at least one indentation of substantially complementary shape to said tooth enabling nesting of the cross-bar assembly in the bearing parallel to the pivot axis and in that the tooth at the end of the cross-bar assembly is disposed so as not to face the corresponding indentation at least when the cross-bar assembly is in the rest position.

Thanks to these features, the tooth at each end of the cross-bar assembly prevents said cross-bar assembly from being disengaged from the bearings of the slides with the result that there is no longer any risk of it being thrown off in the event of a violent impact.

Moreover, since the cross-bar assembly remains mounted on the slides, it normally retains its function of unlocking the slides even after a violent impact, which is useful notably for evacuating the passenger from the seat or other passengers from the vehicle after the impact.

Preferred embodiments of the slide of the invention may make use of one or more of the following features:

the tooth at each end of the cross-bar assembly is disposed so as not to face the corresponding indentation in any position of the cross-bar assembly between its rest position and its actuating position; thus prevents disengagement of the cross-bar assembly, even if the cross-bar assembly is moved out of its rest position during the impact;

the cross-bar assembly is part of a support part attached to the second structural section of each slide;

each second structural section includes a lateral flange facing the cross-bar assembly and pierced by an opening, said support part being clipped into said opening;

the support part includes a plurality of lugs that are provided with exterior hooks and are flexible inward to allow clipping of said hooks onto the lateral flange of the second structural section, said lugs at least partly defining said bearing and being prevented from flexing inward by the bearing surface of the cross-bar assembly that is pivotally mounted in said bearing; this gives the mounting of the support part on the second structural section a high resistance to being pulled out:

said support part is produced in plastic material.

Moreover, the invention also provides a vehicle seat including a set of slides as defined above and a seat cushion carried by said set of slides.

BRIEF DESCRIPTION OF THE DRAWINGS

Other features and advantages of the invention will become apparent in the course of the following description of one embodiment of the invention given by way of nonlimiting example with reference to the appended drawings.

In the drawings.

DETAILED DESCRIPTION OF THE DISCLOSURE

In the various figures, the same references designate identical or similar elements.

Figure 1:
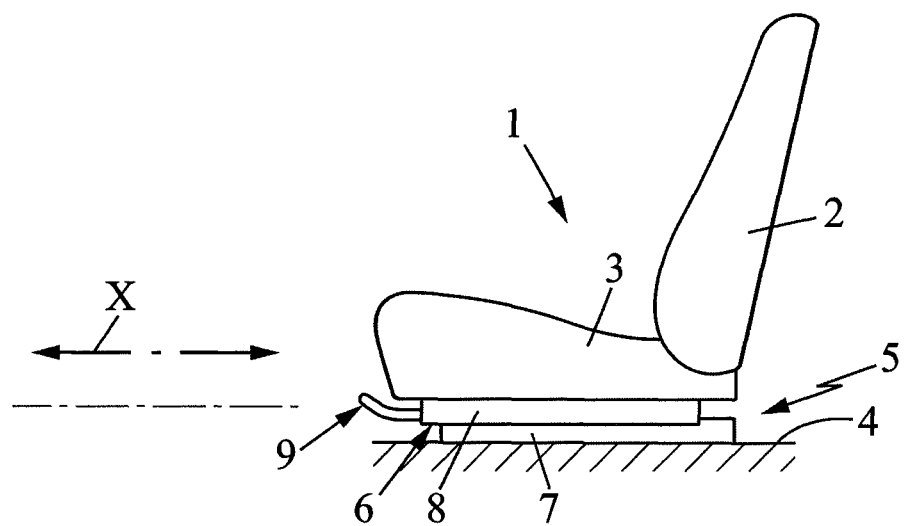
FIG. 1 is a diagrammatic view of a seat that may include a set of slides of one embodiment of the invention.

FIG. 1 shows an automobile vehicle seat 1 that comprises a seat back 2 carried by a seat cushion 3 itself mounted to slide on the floor 4 of the vehicle in a substantially horizontal longitudinal direction X.

The seat cushion 3 is attached to the floor 4 by a set 5 of parallel slides comprising two parallel slides 6 only one of which can be seen in FIG. 1.

Figure 2:
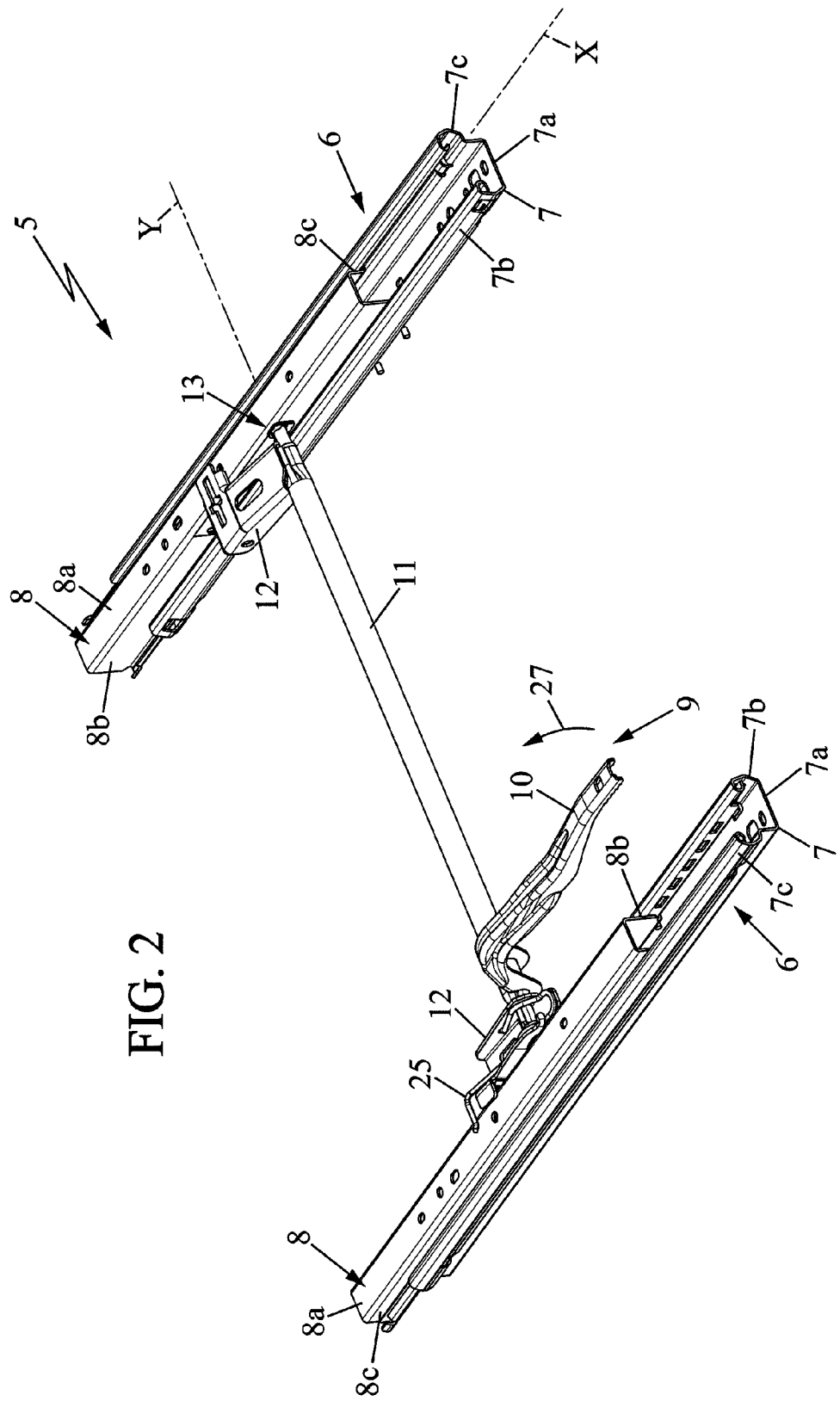
FIG. 2 is a perspective view of the set of slides of the seat from FIG. 1.
Figure 3:
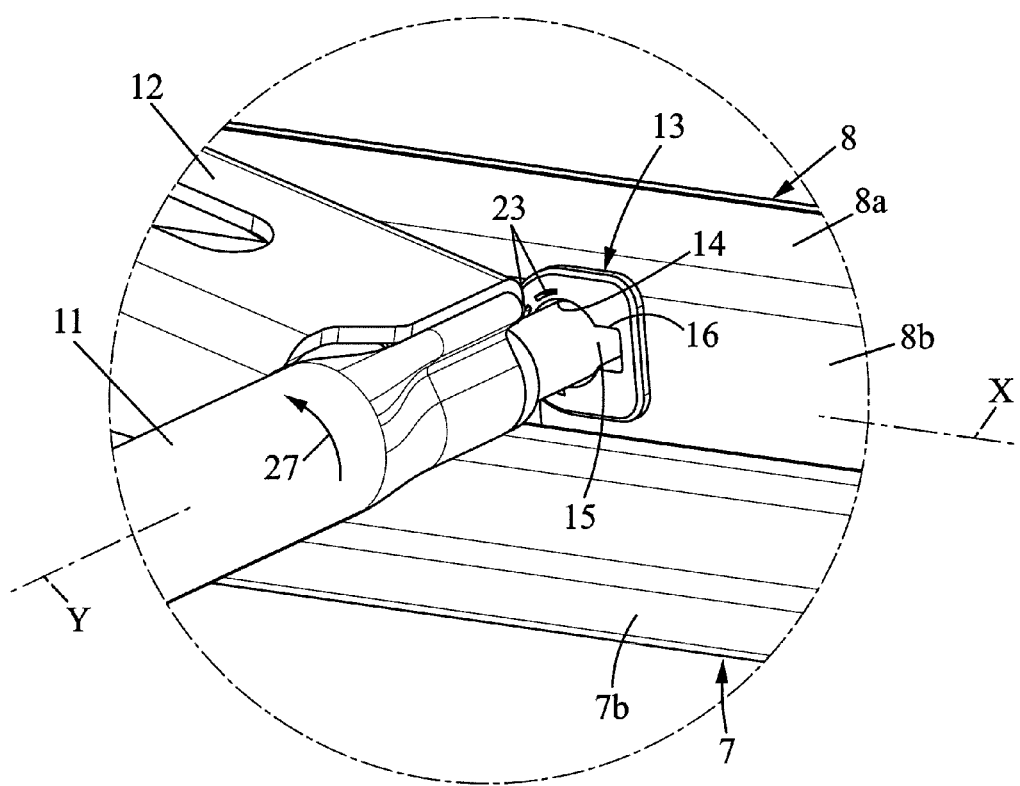
FIG. 3 is a detail perspective view showing the pivoting mounting of the cross-bar assembly on one of the slides of the set from FIG. 2.

As shown in FIG. 2, each of the slides 6 includes first and second slide elements 7, 8 formed by a respective fixed metal structural section 7 attached to the floor 4 and a mobile metal structural section 8 attached to the seat cushion 3 that slide one on the other in the direction X.

The fixed structural section 7 may have a substantially U-shaped section open at the top, for example, comprising:
- a horizontal bottom 7a,
- an interior lateral flange 7b oriented toward the other slide 6, and
- an exterior lateral flange 7c oriented toward the exterior of the seat.

For its part, the mobile structural section 8 may have a substantially U-shaped section open at the bottom, for example, comprising:
- a horizontal upper core 8a,
- an interior lateral flange 8b oriented toward the other slide 6, and
- an exterior lateral flange 8c oriented toward the exterior of the seat.

Figure 4:
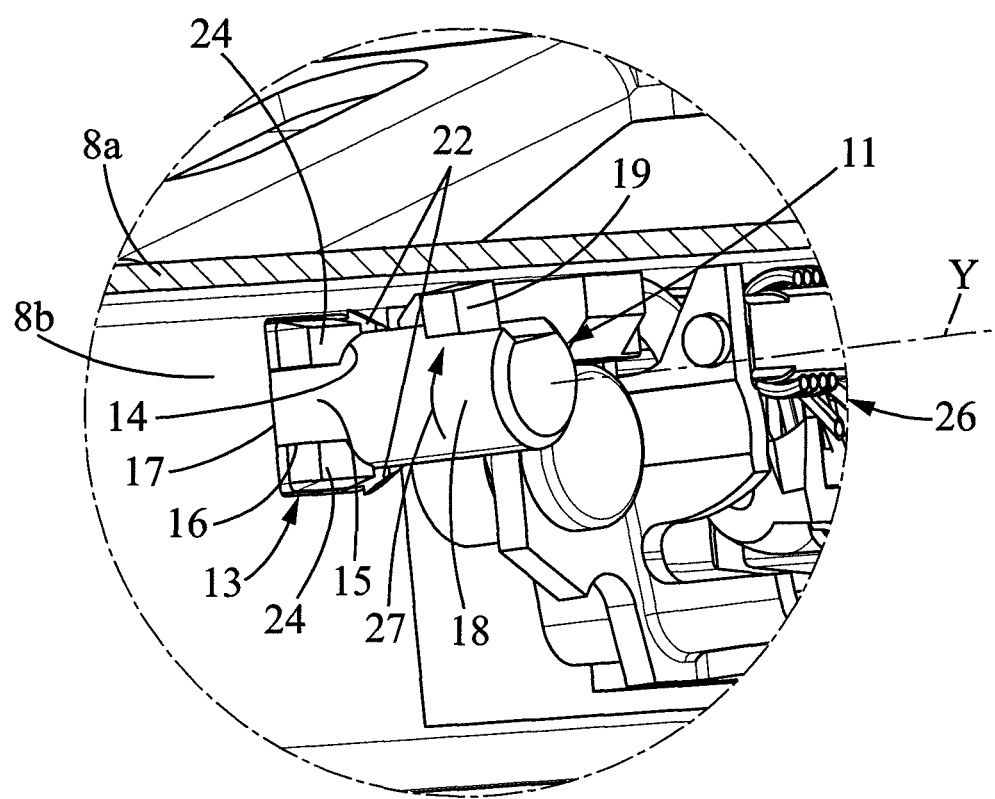
FIG. 4 is a cutaway detail view in perspective showing the pivoting mounting from FIG. 3 as seen from the interior of the slide.
Figure 5:
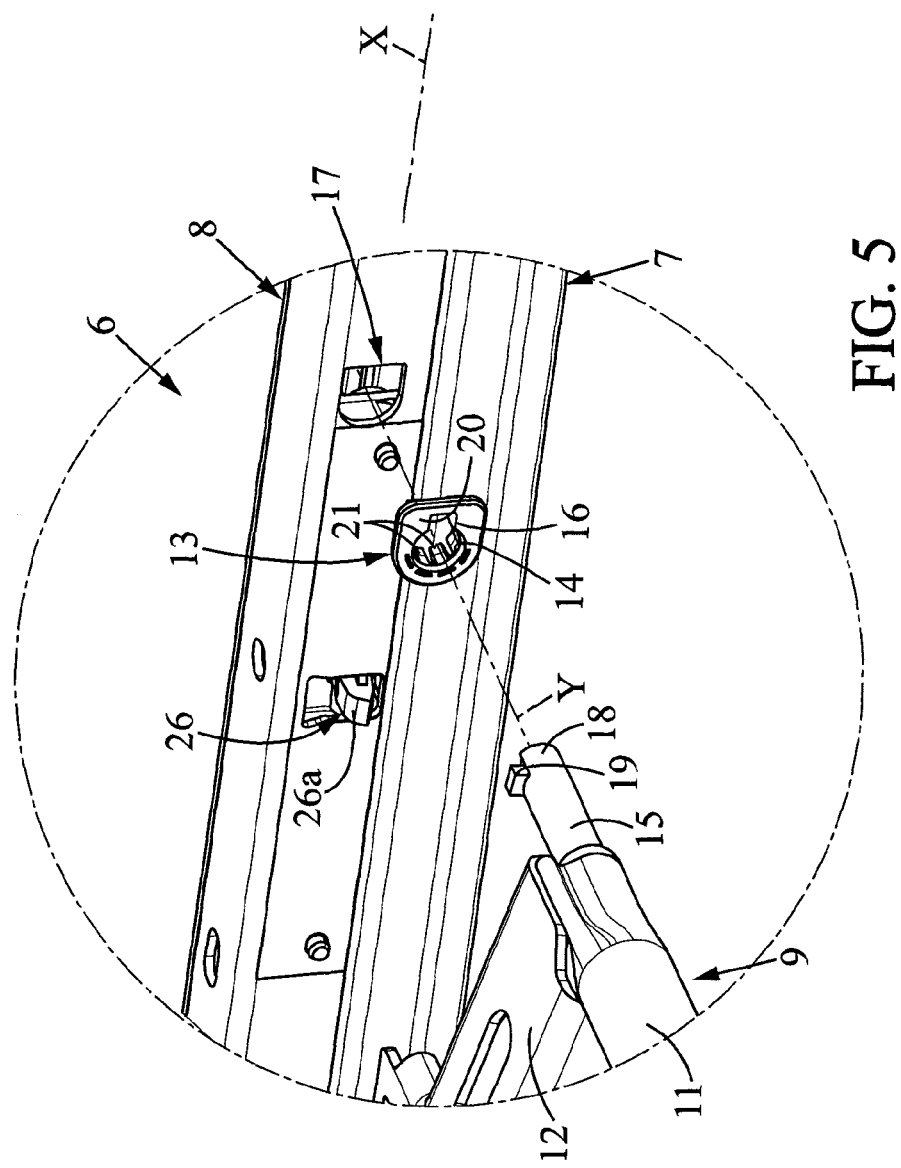
FIG. 5 is an exploded detail view similar to FIG. 3, FIGS. 6 and 7 are perspective views in two opposite directions of the support part forming a bearing for the ends of the cross-bar assembly of the set of slides.
Figure 8:
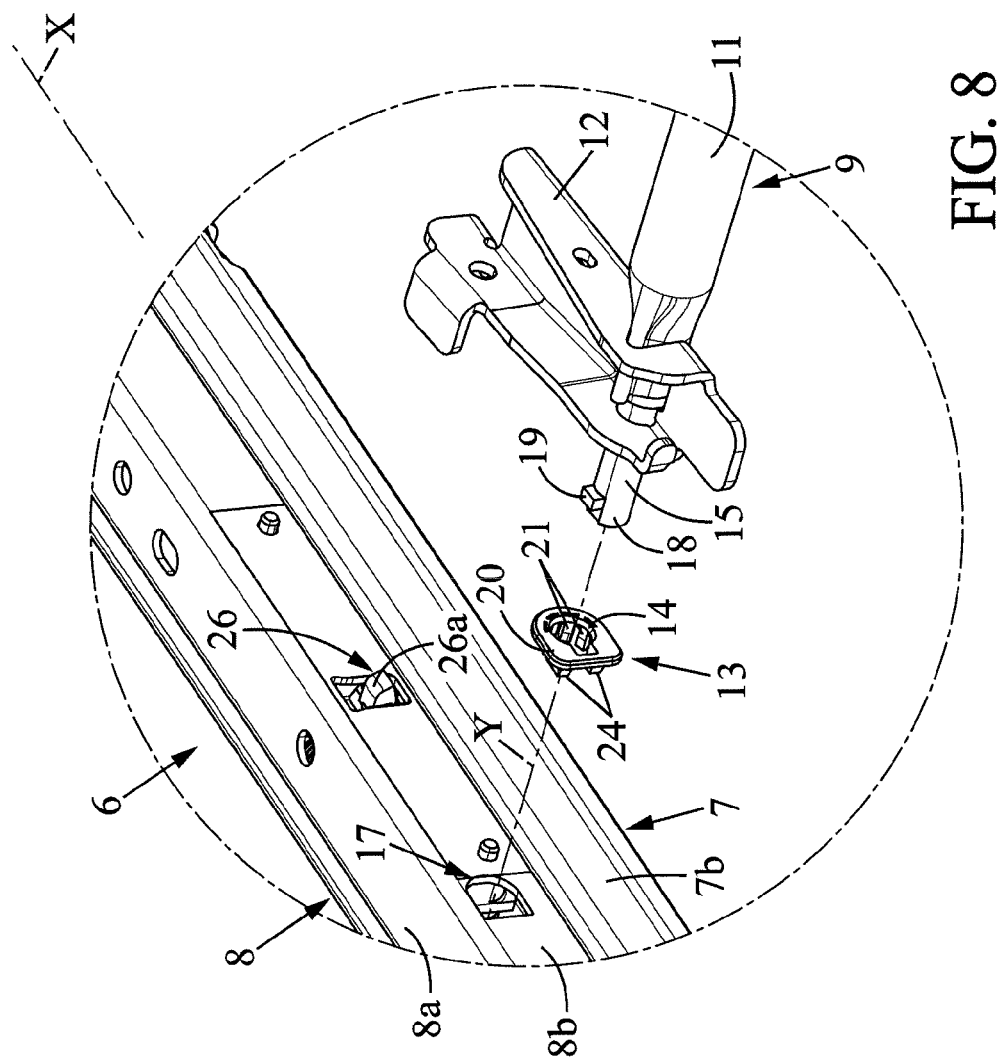
FIG. 8 is an exploded view similar to FIG. 5 showing the pivoting mounting of the cross-bar assembly on the other slide of the set of slides from FIG. 2.

Each of the slides 6 is provided with an internal lock 26 visible in FIGS. 4, 5 and 8. This lock is adapted selectively to prevent or allow relative sliding between the two structural sections 7, 8 of the slide, said lock being spring-loaded toward a locked position in which it prevents relative sliding of the structural sections 7, 8. Each lock 26 may for example include an unlocking lever 26a (see FIGS. 5 and 8) projecting via a window provided in the interior lateral flange 8b of the mobile structural section of the corresponding slide, this unlocking lever 26a being adapted to be operated to unlock the lock. Of course, numerous other locking member configurations are possible. By way of nonlimiting example, the lock 26 may operate in accordance with the principle described in the document FR-A-2 919 234, but numerous other types of slide lock are available to the person skilled in the art.

The two slides 6 are normally in a locked state in which they prevent sliding of the seat cushion 3 of the seat parallel to the longitudinal direction X and the locks 26 of the two slides may be unlocked simultaneously by manually actuating a cross-bar assembly 9 clearly visible in FIG. 2. The cross-bar assembly 9 is adapted to act simultaneously on the unlocking levers 26a of the two slides 6 to unlock them.

This cross-bar assembly may include, for example:
- a handle 10 or any other holding member extending forward under the seat cushion 3 so that it can be grasped by a passenger in the seat 1 from in front of the seat cushion 3,
- a rigid transverse bar 11 mounted to pivot on the interior lateral flanges 8b of the mobile structural sections of the two slides about a transverse horizontal pivot axis Y, this transverse bar 11 being rigidly fastened to the handle 10, and
- two actuating levers 12 rigidly fastened to the transverse bar 11 and extending rearward in the opposite direction to the handle 10.

The cross-bar assembly 9 is spring-loaded, for example by a spring 25, toward a rest position (visible in FIG. 2) in which the actuating levers 12 do not interfere with the unlocking levers 26a of the locks 26. On the other hand, if a user actuates the handle 10 by causing it to pivot upward in the angular direction 27 to an actuating position, the actuating levers 12 of the cross-bar assembly act on the respective unlocking levers 26a of the locks 26, simultaneously unlocking the two slides 6, which enables the user to adjust the longitudinal position of the seat 1.

As shown in more detail in FIGS. 3 to 5 and 8, the two ends of the transverse bar 11 of the cross-bar assembly 9 each include a circular-section bearing surface 15 that is pivotally mounted in a bearing 14 of generally circular shape rigidly fastened to the interior lateral flange 8b of the corresponding mobile structural section 8.

In the example shown, the bearings 14 each belong to a support part 13 fixed to the corresponding interior lateral flange 8b, for example a plastic material support part 13 that is fixed by clipping it into an opening 17 in said interior lateral flange 8b.

As shown in FIGS. 4, 5 and 8, the transverse bar 11 of the cross-bar assembly extends beyond the bearings 14 as far as two free ends 18 each of which includes at least one tooth 19 projecting radially outward. Moreover, the corresponding bearing 14 includes at least one indentation 16 of substantially complementary shape to said tooth 19. In the example shown, each end 18 of the transverse bar 11 includes a single tooth 19 and each bearing 14 includes a single indentation, but each end 18 could include a plurality of teeth 19, in which case each bearing 14 would include a plurality of indentations 16 through which the teeth 19 could pass on nesting the ends 18 of the transverse bar 18 in the bearings 14.

The indentations 16 of the bearings 14 enable nesting of the ends 18 of the transverse bar 11 in the bearings 14 parallel to the pivot axis Y during mounting of the set 5 of slides in an angular position of the cross-bar assembly 9 that is not part of the angular range extending from the rest position to the actuating position.

After the set 5 of slides is mounted, the cross-bar assembly 9 is normally in the rest position in which the tooth 19 at each end of the transverse bar no longer faces the corresponding indentation 16 of the cross-bar assembly 14. Similarly, if the cross-bar assembly is moved into its actuating position by pivoting in the angular direction 27 the teeth 19 no longer face the corresponding indentations 16 since said teeth 19 then move in the opposite direction to said indentations.

Accordingly, the teeth 19 at the ends 18 of the transverse bar prevent the cross-bar assembly from being disengaged from the bearings 14 of the slides, with the result that there is no risk of said cross-bar assembly being thrown off in the event of a violent impact and it normally retains its function of unlocking the slides even after a violent impact.

Figure 6:
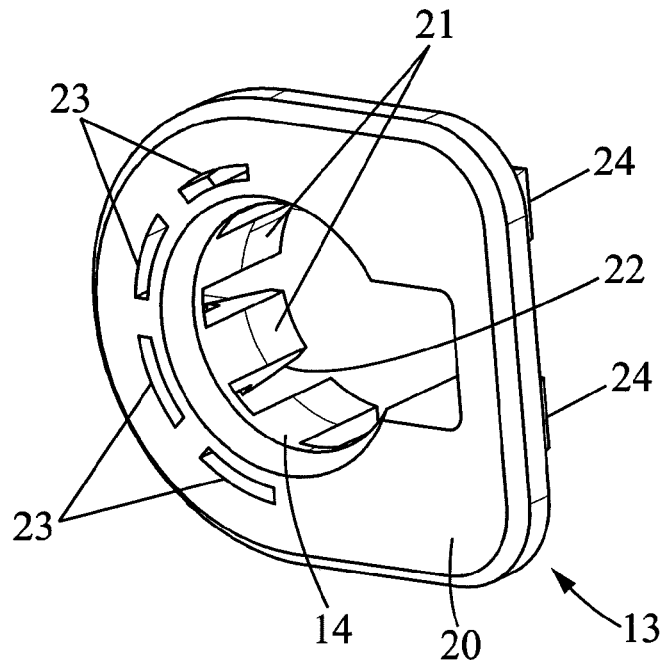
Figure 7:
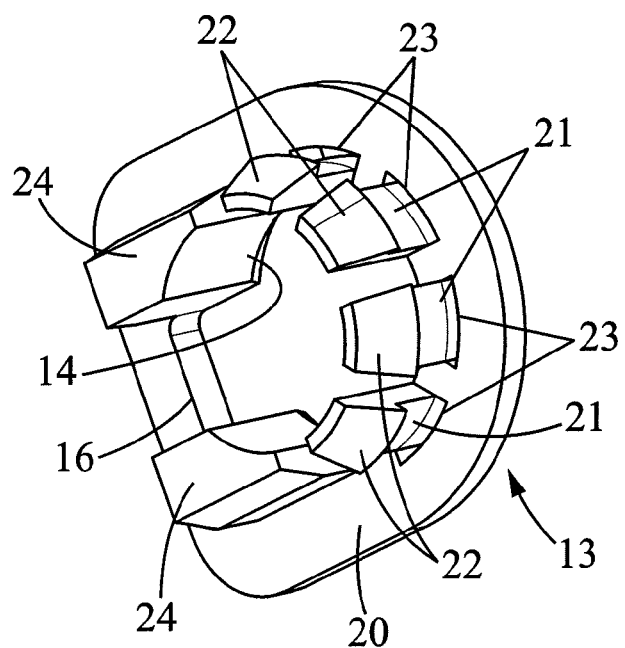

As shown in more detail in FIGS. 6 and 7, the support part 13 that forms each bearing 14 may include, for example:
- a front wall 20 that comes to bear against the external face of the interior lateral flange 8b of each mobile structural section 8;
- a plurality of elastic lugs 21 that extend parallel to the pivot axis Y toward the interior of the slide 6 from the front wall 20, each as far as an exterior hook 22; these lugs 21 are inwardly flexible to enable clipping of said hooks 22 onto the lateral flange of the second structural member; the lugs 21 are disposed in a circular arc centered on the pivot axis Y and engaged against a circular-arc-shaped edge of the opening 17 and the internal faces of said lugs 21 partially define the bearing 14 of circular general shape; the front wall 20 may include recesses 23 facing the hooks 22 of the lugs 21 to facilitate molding said hooks;
- two inflexible blocks 24 that extend parallel to the pivot axis Y toward the interior of the slide 6 from the front wall 20; the external faces of these blocks 24 are engaged against right-angle edges of the opening 17, preventing the support part 13 from turning in said opening 17, and each of these blocks 24 has a part-cylindrical internal face centered on the axis Y that together with the internal faces of the abovementioned lugs 21 form the bearing 14.

It will be noted that when the bearing surface 15 of the transverse bar 11 is engaged in the corresponding bearing 14, the lugs 21 are prevented from flexing radially inward, enabling a high resistance to pulling out of the mounting of the support part 13 on the mobile structural section 8 to be achieved.

The invention claimed is:

1. A set of slides for vehicle seats, including two parallel slides, each slide including:
   first and second structural sections mounted to slide relative to each other in a longitudinal direction, the second structural section of each slide including a bearing of circular general shape,
   a lock adapted selectively to prevent or allow relative sliding between the first and second structural sections,
   the set of slides further including a cross-bar assembly having two circular-section bearing surfaces that is pivotally mounted in the respective bearings to pivot about a transverse pivot axis perpendicular to the longitudinal direction, said cross-bar assembly extending beyond said bearings as far as two ends, the cross-bar assembly being urged toward a rest position in which it does not interfere with the locks of the slides and said cross-bar assembly being adapted to be moved manually to an actuating position to unlock the locks of the slides,
   wherein each end of the cross-bar assembly includes at least one tooth projecting radially outward and the corresponding bearing includes at least one indentation of substantially complementary shape to said tooth enabling nesting of the cross-bar assembly in the bearing parallel to the pivot axis and in that the tooth at the end of the cross-bar assembly is disposed so as not to face the corresponding indentation at least when the cross-bar assembly is in the rest position.

2. The set of slides according to claim 1, wherein the tooth at each end of the cross-bar assembly is disposed so as not to face the corresponding indentation in any position of the cross-bar assembly between its rest position and its actuating position.

3. The set of slides according to claim 1, wherein the cross-bar assembly is part of a support part attached to the second structural section of each slide.

4. The set of slides according to claim 3, wherein each second structural section includes a lateral flange facing the cross-bar assembly and pierced by an opening, said support part being clipped into said opening.

5. The set of slides according to claim 4, wherein the support part includes a plurality of lugs that are provided with exterior hooks and are flexible inward to allow clipping of said hooks onto the lateral flange of the first structural section, said lugs at least partly defining said bearing and being prevented from flexing inward by the bearing surface of the cross-bar assembly that is pivotally mounted in said bearing.

6. The set of slides according to claim 5, wherein said support part is produced in plastic material.

7. A vehicle seat including a set of slides according to claim 1 and a seat cushion carried by said set of slides.

* * * * *